Dec. 15, 1959   J. W. EDMINSTER ET AL   2,917,370
PROCESS FOR THE PRODUCTION OF CARBON BLACK
Filed April 26, 1950   4 Sheets-Sheet 2
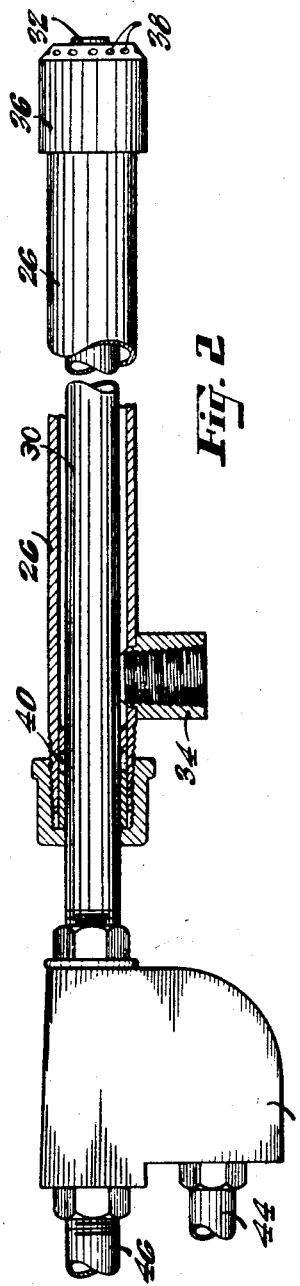
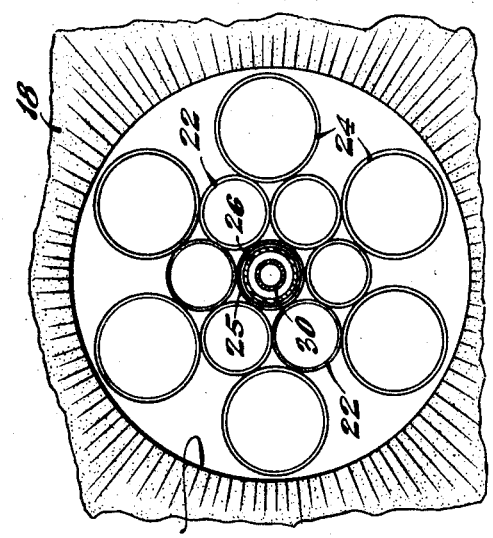
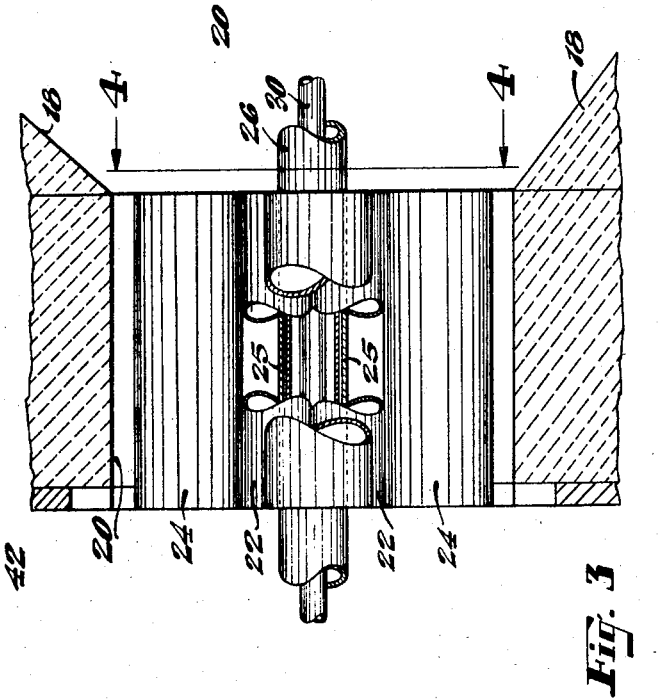
INVENTORS.
George F. Kriauf,
James W. Edminster and
Curt B. Beck.
by Stowell & Evans   Attys.

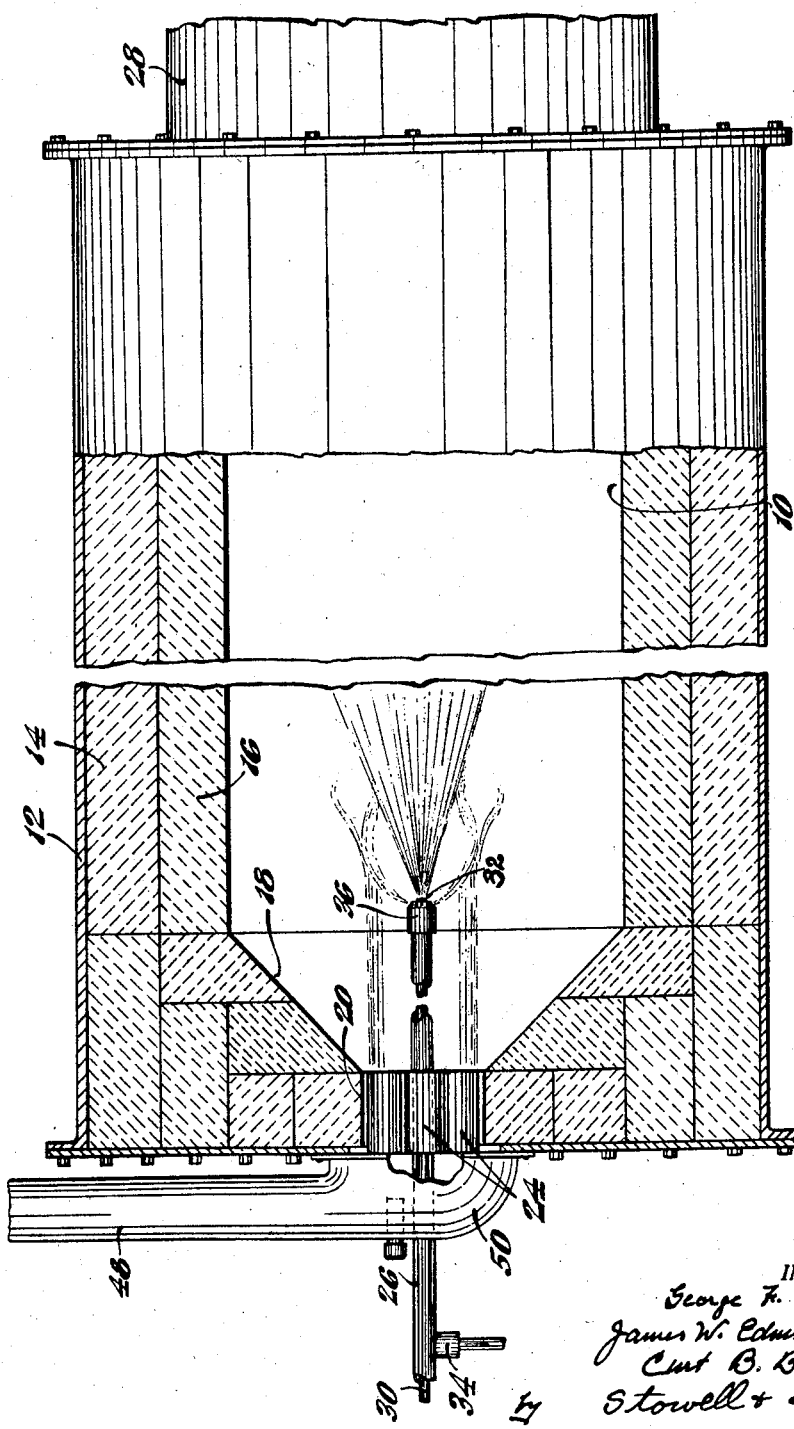

Dec. 15, 1959    J. W. EDMINSTER ET AL    2,917,370
PROCESS FOR THE PRODUCTION OF CARBON BLACK
Filed April 26, 1950    4 Sheets-Sheet 3

INVENTORS
George F. Friauf,
James W. Edminster and
Curt B. Beck.
by Stowell & Evans

United States Patent Office 2,917,370
Patented Dec. 15, 1959

2,917,370

PROCESS FOR THE PRODUCTION OF CARBON BLACK

James W. Edminster, Curt B. Beck, and George F. Friauf, Pampa, Tex., assignors to Godfrey L. Cabot, Inc., Boston, Mass., a corporation of Massachusetts Application April 26, 1950, Serial No. 158,226

13 Claims. (Cl. 23—209.4)

This invention relates to processes and apparatus for producing carbon black and comprises more particularly an improved process for producing carbon black from liquid hydrocarbons. It includes within its scope novel apparatus by which such carbon black may be produced.

Carbon blacks are often differentiated one from another on the basis of the hydrocarbon raw material from which they are produced. Blacks produced from gaseous hydrocarbons may thus be denominated gas blacks and those produced from liquid hydrocarbons oil blacks. It is to apparatus and to a process for producing oil blacks that our invention relates.

Whatever their source, all carbon blacks are obtained from the dissociation of a hydrocarbon progenitor while exposed to intense heat under controlled conditions. Any carbon black so produced may be used as a coloring or reinforcing pigment. However, until recently the oil blacks have been found to be inferior in many respects to the gas blacks, particularly in their property of reinforcing rubber designed for service in which high abrasion is encountered, as in tire tread.

We have now discovered a process for the production of oil blacks which are the equal of and in some respects are superior to the gas blacks as reinforcing agents in natural and synthetic rubber compounds; and it is the efficient production of such oil blacks of various characteristics that constitutes the principal object of our invention.

Irrespective of the improvement in product the use of liquid hydrocarbonaceous raw material as a source of carbon black has a number of advantages. A new and plentiful supply of cheap raw material is made available to augment the diminishing deposits of natural gas; manufacturing facilities can be located without regard to the availability of supplies of natural gas; and of importance is the fact that the ratio of yield of carbon black to total theoretical carbon content may be substantially greater for the liquid than for the gaseous hydrocarbons.

We have found that by spraying atomized hydrocarbon oils falling within a definite and limited range of composition and physical characteristics into a heat insulated reaction chamber and surrounding the oil spray with a turbulent combustion zone, it is possible to dissociate the major portion of the hydrocarbon oil into carbon black of high quality and in very good yield. We have found that in order to obtain satisfactory yields of carbon black of good quality it is essential that the hydrocarbon oils have a hydrogen to carbon ratio of from about 0.75 to about 1.25 and a mean molecular weight of from about 225 to about 550. Particularly suitable are "residual oils" having the H/C ratio and mean molecular weight specified above and having an A.P.I. gravity of not more than 10, a viscosity in excess of 30 SSU (Saybolt seconds Universal) at 210° F., and a Conradson carbon residue in excess of 1.5.

The term "residual oil" as used herein includes oils and tars remaining from a wide variety of hydrocarbon distillation and cracking operations, including the tarlike substances left in the destructive distillation of coal. Such oils are characterized by not being fully vaporizable under atmospheric pressure and some of them will crack before as little as 50% has gone overhead.

Typical residual oils useful in the practice of the invention are listed in Table I.

*Table I*

| Example | Source | H/C Ratio | Average Mol. Wt. | A.P.I. Gravity | Conradson Carbon Residue, Percent | Viscosity, SSU—210° F. |
|---|---|---|---|---|---|---|
| I | Petroleum | 1.08 | 391 | 0.5 | 7 | 108 |
| II | do | 1.1 | 310.5 | −0.5 | 17.4 | 135 |
| III | do | 1.16 | 250 | 10.0 | 5 | 35.5 |
| IV | do | 1.05 | 440 | 8.8 | 20 | 337 |
| V | Coal Tar | 1.09 | 277 | 3.7 | 2 | 37 |
| VI | Petroleum | 1.08 | 314 | 1.7 | 15.3 | 84 |
| VII | Coal Tar | 0.79 | 399 | −10.8 | 24 | 112 |
| VIII | Petroleum | 1.15 | 227 | 3 | 4 | 41.5 |

The carbon blacks produced by the process of our invention differ notably in structure properties from blacks produced from natural gas. This term "structure" is a term of art which is used to describe certain carbon blacks which resist mechanical densification to a much greater degree than do the non-structure blacks of comparable particle size. The Gardner oil absorption measurements further distinguish structure carbons from non-structure carbons. In the case of structure carbons the Gardner oil absorption always is in excess of 100 lbs. of oil/100 lbs. of black and is always at least 10 lbs. of oil/100 lbs. of black greater than the oil absorption of a non-structure black of comparable particle size.

Structure is also characterized by its effect upon rubber compounds. The greater the amount of structure in the carbon black, the smoother will be the extruded rubber and the less will be the extrusion shrinkage. Moreover, the higher the structure of the carbon black the higher will be the modulus and hardness of the rubber in which compounded. Structure is, however, a matter of degree and since all blacks produced from hydrocarbon oils by the practice of our invention have more structure than the gas blacks they are commonly referred to as structure blacks.

While all manner of liquid hydrocarbons, including heavy oils, pitches and tars, have been used as a source of lampblack, which is a particular type of carbon black, the lampblacks produced therefrom have not been used extensively in rubber because of their inferior reinforcing characteristics. The structure blacks produced from oils by the practice of our invention have superior rubber reinforcing qualities and are not lampblacks at all as that designation is used by the industry but are closely akin to the gas blacks in performance.

Heretofore, to the best of our knowledge, it has been considered manifestly impossible to produce practicably high quality carbon blacks from residual oils. It is a principal object of our invention to provide a process and apparatus whereby such blacks may be produced cheaply and efficiently from those oils.

It is also an object of our invention to provide novel apparatus for the production of such blacks which is inexpensive to construct from component parts most of which are commercially available and require little reworking for adaptation.

It is also an object of our invention to provide a process and apparatus for the production of a wide variety of oil blacks suitable for almost any use to which gas blacks are now put.

It is likewise an object of our invention to provide both process and apparatus for producing oil blacks having characteristics not reproducible from gas by any known process.

It is a further object of our invention to provide such process and apparatus for the production of blacks from residual oils which blacks will impart to natural and synthetic rubber both high resistance to abrasive wear and remarkable smoothout properties.

The novel process by which we accomplish the objects of our invention and establish the necessary operating conditions for the production of any given type of carbon black, within its inherent limitations, is extremely simple and easy to carry out yet is almost unlimited in scope and versatility. In a typical embodiment it consists in atomizing a hydrocarbon oil of the characteristics described above in a bi-fluid mixer with a gas at moderate pressure, introducing the atomized oil in the form of a conical spray into a heat-isulated reaction chamber, simultaneously injecting thereinto a plurality of supplementary gas jets as an aureole around and closely adjacent to the point of oil spray injection and introducing a large volume of air or other oxygen-containing gas in a stream in such a manner that the air flows past the gas jets and oil spray to support burning of a portion of the combustibles for the generation of heat to dissociate the oil to carbon. It will be obvious that the variables in this process are legion. All of the necessary constituents are so consolidated in a small area that their interaction is precisely controllable over wide ranges. By varying the nature, volume and velocity of the atomizing and supplementary gases an almost infinite variety of combinations are possible to establish any desired operating conditions.

For example, one characteristic of carbon black which serves to differentiate one type of black from another is average particle size. Generally speaking, color and rubber reinforcing qualities diminish as average particle size increases. Particle size is determined by the speed and duration of the hydrocarbon dissociation reaction. Both reaction factors are themselves determined by rate of combustion which establishes flame temperature and rate of dilution by combustion products. It is important in the production of carbon black so to control combustion rate that desired particle size is achieved at as high yield as possible. The same reasoning can likewise be applied to the attainment of other sought-after carbon black qualities. By the process of our invention we are able to exercise precise control over combustion rates and other operating conditions using the heavy residual oils which are otherwise extremely hard to handle, as will appear in greater detail hereinafter.

To explain the results of our invention another way; we know that the quality and yield of carbon black are determined by the characteristics of the flame in which the carbon black is formed. It is believed that the presence of carbon black particles and nuclei of carbon within a given system catalyzes the pyrolysis of a hydrocarbon to form carbon black. Furthermore, we know that the presence of diluents tends to favor the production of fine size particles. Other factors which favor the formation of fine particlfffies of carbon black are short reaction zone contact time and intense heat.

From this it appears that the mechanism of carbon black formation is somewhat analogous to that of rain formation in that there is progression from embryo to developed nuclei and subsequent building up of these nuclei to complete particles by deposition of like material thereon.

In the case of carbon black, as dissociation commences carbon atoms are liberated. Those that are not destroyed upon collision with oxygen molecules will tends to join together into a discrete particle which, for want of a better term, we refer to as the carbon black nucleus. Presumably as few as 10 carbon atoms will be sufficient to form a nucleus. Thereafter the nucleus functions as pyrolysis catalyst so that later dissociating hydrocarbon preferentially deposits its carbon atoms on the nucleus rather than releasing them into the furnace atmosphere. Thus as reaction continues greater numbers of carbon atoms are taken up before they can collide with molecules of the air gases than at the beginning of the process and the nuclei grow to particles of recoverable size.

The amount of particle growth will thus depend upon several conditions—the size of the oil droplets introduced into the reaction zone, the rapidity with which the reaction is caused to proceed and the duration of the reaction. The larger the individual oil drops introduced into the reaction zone the fewer will be the nuclei formed so that there will be more available hydrocarbon to build up on each nucleus. Conversely, at constant flow rates more and smaller drops will provide a greater number of nuclei having less additional hydrocarbon available to dissociate on each one.

Even more important is the effect of reaction speed and duration upon the ultimate size of the carbon black particles. Where operating conditions are such that combustion is rapid, a large amount of heat will be generated quickly, heat transfer and reaction will be rapid and the dilution effect of the hot products of combustion on the dissociating raw material will be pronounced, all these factors tending to produce a small particle size black having marked qualities of abrasion resistance, etc., in natural and synthetic rubber compounds as shown below. On the other hand, with decrease in the rate of combustion there will be concomitant decrease in the rate and amount of resulting effects which is evident in larger particle size of the black produced.

These and other features of our invention will best be understood and appreciated from the following description of a typical embodiment of our novel apparatus, selected for purposes of illustration and shown in the accompanying drawings in which:

Fig. 1 is a diagrammatic view, partly in section, showing the apparatus in side elevation;

Fig. 2 is a view in elevation, partly in section, of the burner portion of the apparatus;

Fig. 3 is an enlarged cross-sectional view of the throat of the furnace showing the burner pipe and straightening vanes in operative position;

Fig. 4 is an end view of the straightening vanes showing the burner pipe, in section;

Figure 5:
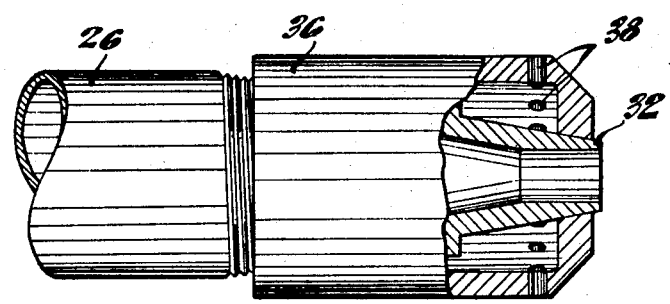
Fig. 5 is a detail, partly in cross-section, of the atomizing tip and burner head with peripheral orifices.

Referring to the drawings, the furnace herein shown includes an elongated reaction chamber 10, which may be of any convenient cross sectional shape, having a steel shell 12, a course of insulating brick 14 and a lining 16 of highly refractory material. At the left or inlet end the reaction chamber 10 tapers, as shown at 18, to an inlet passage or throat 20 of lesser diameter than that of the reaction chamber 10 of the furnace and which provides the only inlet to the furnace. This furnace taper 18 is important in that it approximates the angle of the oil spray cone and thus promotes more efficient radiant heat transfer to the oil spray. Located in throat 20 are air guide vanes 22 and 24 which may be of any convenient shape but which are here shown as a nest or cluster of short cylinders welded together in parallel relation. As herein shown the nest includes an inner group of six small cylinders 22 and an outer group of six larger cylinders 24, all symmetrically arranged about a single central cylinder 25 of the smaller diameter. A burner pipe 26 is centered in the throat 20 and extends through the central cylinder 25, or the cylinder may be omitted from the nest to accommodate the pipe 26. Alternatively, the guide vanes may be omitted completely.

The reaction chamber 10 is open at the end opposite the burner and with this communicates a conventional flue pipe 28 for the passage of the gaseous products of combustion and entrained carbon black to the collectors and exhaust stack in the usual manner.

The combination burner of our invention through which raw materials and supplemental gases are introduced into the furnace is shown in Fig. 2. This burner consists of a horizontal oil pipe 30 ending in a constricted oil nozzle 32 of the flared inlet or orifice type, enclosed concentrically by a larger pipe 26 terminating in a gas head 36. This gas head 36 is provided with a plurality of gas orifices 38 disposed equidistant from one another around its periphery.

Figure 6:
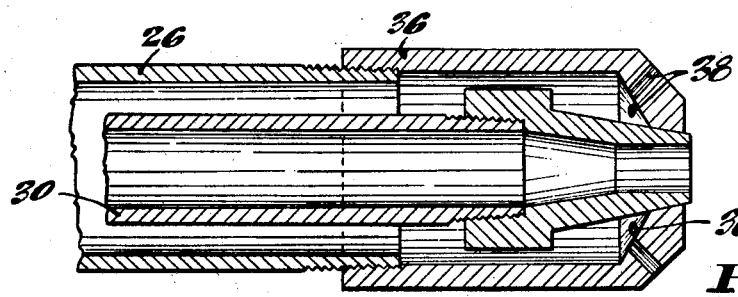
Fig. 6 is a cross sectional view of tip and burner similar to Fig. 5 but showing burner orifices disposed at an angle of 45° to the axis of the burner pipe.
Figure 7:
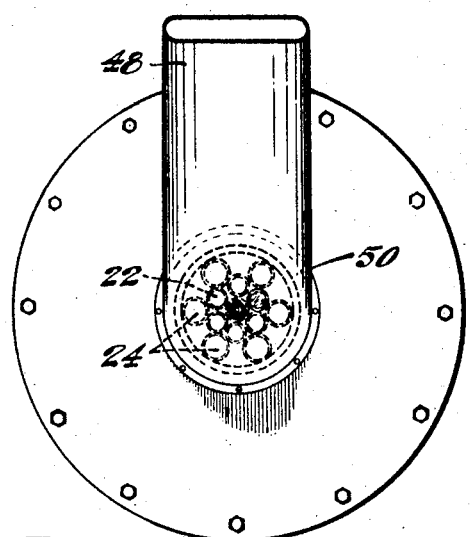
Fig. 7 is a view of the front of the furnace showing one convenient type of air duct and header assembly.

The forward edge of gas head 36 is bevelled to present a conical surface at any desired degree of angularity to its axis. The orifices 38 may be directed outwardly either radially, as shown in Fig. 5, or forwardly at an angle of less than 90° to the axis of the burner pipe, as shown in Fig. 6. The opposite end of pipe 26 is sealed against leakage by packing 40.

The pipe 30 terminates outside the furnace in a mixing chamber 42 where the liquid hydrocarbon raw material, preferably preheated to improve its fluidity, and supplied through inlet pipe 44 is initially aspirated by and mixed with air, steam or other gaseous atomizing fluid or mixture thereof introduced through pipe 46. The mixing chamber 42 may be of any conventional design which employs the two fluid atomization principle. A number of commercial mixers are readily available and satisfactory for the purposes of our invention.

In operation the gas atomized mixture of oil is forced through constricted nozzle 32 and is discharged into the reaction chamber 10 in the form of a conical spray composed of minute droplets of from about 80 to 1100 microns in diameter depending upon rates of flow, velocities, etc. From the gas head 36 surrounding the oil tip, with its plurality of orifices preferably directed outwardly and in a generally downstream direction, a gas, which may be a combustible gas or vaporized oil, or air, or an inert gas such as steam, or a mixture of such gases, is injected at a velocity selected with relation to the oil spray velocity. Air flows into the furnace under low pressure (between about 4–8 inches of water) from header 50 through throat 20 and thence travels past gas head 36. When a combustible gas is supplied through gas head 36 the resulting jets combine with the low pressure air to burn in preference to the oil. Only that proportion of air not taken up by the gas will go to support combustion of the oil. If air is employed in the gas head instead of gas, naturally only the oil will burn. Due to the juxtaposition of the jets unusually rapid mixing of air with oil takes place to produce an exceptional quality of carbon black. However, because of the substantially reduced yields resulting from the use of air we ordinarily prefer to utilize combustible gas or vapor instead of air in the gas head. The shape and velocity of the oil spray, the degree of atomization and the nature of the atomizing gas, the volume of low pressure air and the number, velocity and nature of the supplemental gas jets are all interrelated factors which combine to effect the desired dissociation reaction of the oil as heretofore explained.

As is standard procedure in any furnace process for the production of carbon black a substantial volume of air must be introduced into the furnace to support burning of a portion of the combustible materials in order to provide heat for dissociation of the remainder to carbon. The proportion of air to combustibles introduced into the furnace is recorded in terms of percentage of theoretical combustion and in the production of any type furnace blacks this percentage of combustion will usually lie in the range of between 25 and 50 percent.

The major portion of combustion supporting air, which we have referred to as low pressure air, is supplied to the furnace through duct 48, header 50 and throat 20. The additional sources of air such as atomizing gas and air, if any, supplied through gas head 36 represent but a small fraction of the total amount of air necessary to achieve the required amount of combustion.

Since a substantial amount of fuel must be burned in any event we can achieve a considerable saving in liquid raw material by the use of supplemental combustible gas jets injected around and close to the raw material spray, as from gas head 36. These jets not only play a considerable part in improving quality as explained elsewhere herein but also in increasing yields. Such gas jets burn rapidly to provide a hot intense flame concentrated around the oil spray. Since this gas burns in preference to the oil, in the main only the excess of air over that required to support complete combustion of the gas will be available to support burning of the oil. Normally we introduce a volume of low pressure air in excess of that required for theoretical complete combustion of the supplemental gas so that a small portion of the oil burns as well. However, in determining what volume of air to use for any given production condition we make our selection on the basis of the total combustibles introduced regardless of which type will tend to burn most readily.

By no other process that we know of is it possible to obtain such a wide variety of operating conditions with such delicacy of control as we are able to achieve.

Now considering the operation of the process of our invention in the light of the mechanism of carbon black formation it is evident that the oil should be subdivided to the optimum degree for the production of any given black and that combustion should be made to proceed at the optimum rate and for the optimum duration for such production.

Because the preferred residual oils are heavy and are not completely vaporizable, in some instances not being more than 50% vaporizable before cracking, they cannot be satisfactorily sub-divided for introduction into the reaction chamber by vaporization techniques. High pressure in excess of about 2,000 pounds per sq. inch may be used to obtain atomization. However, such high pressures are expensive and difficult to use and tend to cause deleterious stratification of gases within the furnace; and there are also certain other advantages achieved by gas atomization, as will subsequently appear, not attainable by pressure atomization. We have found that by atomizing the oil with a gas of a selected type and in the optimum ratios of gas to oil we can closely control the reaction within the oil spray itself. High pressures are not required; pressures of between 25 and 75 pounds per sq. inch are quite satisfactory.

A high precision of control results from the very close juxtaposition of the ring of gas jets to the oil spray and the scope afforded by gas atomization. The residual oils used in our process may differ widely one from another in such properties as viscosity and a set of operating conditions optimum for one oil may be unsatisfactory for another oil. However, any one or a mixture of such oils can be handled with ease by making appropriate adjustments in gaseous flow conditions and by selecting the preferred type of gas.

For example, there are two principal categories of carbon black types which in the present state of the art are considered most desirable. One is that of the small particle size low structure black having high abrasion resistance qualities; the other is a relatively large particle size high structure black which is less reinforcing but which imparts to rubber stock qualities of smoothness and low extrusion shrinkage.

To produce the former of these, the small particle size black, it is necessary to create an environment in the reaction chamber conducive to the formation initially of small particles and to the inhibition of particle growth. Such environment may be established by finely atomizing the oil and injecting the atomized mixture at high velocity in a narrow cone and at the same time supplying a combustible gas from the gas head in sufficient volume and at sufficient velocity to develop a rapidly burning flame. Thus we may use 70–90 cu. ft. of air/gal. of oil for atomization, inject the atomized oil at a velocity factor (see Table II) of between about 600 and 1000 ft./sec. and supply a combustible gas such as natural gas through from 12–24 orifices, likewise at velocity factors of from about 300–1000 ft./sec. under such conditions that the oil spray enters the reaction chamber in a narrow cone largely blanketed externally by an annular sheath of flame and burning somewhat internally by reason of the combustion supporting internal atomizing air. The individual oil droplets, which are initially very small are made even smaller by attrition from burning and the subsequently formed carbon black particles are well insulated one from another by the large volume of diluents released from the rapid combustion. Thus the particles as formed are small and are protected from further growth while proceeding through the reaction chamber. They are likewise of relatively low structure.

To obtain high structure black it is desirable to have a short, bushy hot flame to cause a rapid initial release of nuclei and a reaction which is also of relatively long duration. Such reaction we accomplish by atomizing the oil preferably with a combustible or inert gas, although air can be used, at low gas-oil ratios, in the order of 10–30 cu. ft. of gas/gal. of oil, and injecting the mixture at a relatively low tip velocity factor, in the neighborhood of between about 350 and 600 ft./sec. At the same time we supply supplemental gas, preferably a combustible gas or vapor, to a gas head 36 having relatively few orifices, preferably about 6, at a jet velocity exceeding that of oil spray, which has a tendency to cause the spray cone to flare outwardly. The low pressure air flowing past the burner is sucked into the oil spray in such a manner that complete mixing takes place rapidly. However, the combustion throughout the mixture of gas and oils is sufficiently prolonged so that while the initial reaction proceeds rapidly it is of long duration and substantial particle growth takes place.

It should be noted that the proximity of the gas jets to the oil spray is an important factor in the process of our invention. Not only do these jets increase flame temperature either by virtue of the additional heat supplied when a combustible gas or vapor is employed or by accelerating the rate of mixing when an oxygen-containing gas is used but also they exercise a considerable amount of control over the shape of the oil spray.

Injected, as they are, closely surrounding the oil spray these jets contribute with the oil spray to create a low pressure zone into which the combustion supporting air, herein referred to as low pressure air, is drawn. This suction effect increases the rapidity of gas-air mixing.

To consider again the formation of small particle size low structure black, we utilize a relatively large number of gas jets to create a blanketing effect in order that the low pressure air may preferentially react with the gas so that little low pressure air will be available to consume the oil. On the other hand for the production of the large particle size high structure black it is desirable that more air should reach the oil spray externally since air is not advantageously used as the atomizing gas. To that end we may employ from only 3 to 6 gas jets which assist in the development of heat but which also by their contribution to the suction effect draw additional air to the oil.

One advantage in the use of the surrounding combustible gas jets is clearly demonstrated by the following example showing the conditions for production of a high structure smoothout type black. At hourly flows of 37,500 cu. ft. of air, 2,500 cu. ft. of burner gas, 750 cu. ft. of atomizing gas, the burner and atomizing gases being natural gas, and 50 gals. of oil, the gases will consume 34,300 cu. ft. of the air and leave only 3,200 cu. ft. for the oil. Since the oil requires about 1,620 cu. ft. of air to burn each gallon, theoretically only 2 of the 50 gals., or 4% of the total oil, will be burned, leaving 48 gals. for dissociation to carbon black.

The above are but a few of the many operating changes that can be effected simply and quickly in the process of our invention and by the use of the novel apparatus of our invention. The combination burner can be constructed very cheaply. Orifice and nozzle sizes, the number of gas orifices and even the radius of the circle on which the gas orifices are disposed can be altered with ease without the necessity of changing furnace construction or shutting down operation of the furnace for but a very short time.

Although the process of the invention has been particularly described with reference to the form of apparatus shown in the drawings, the process may be carried out in other forms of apparatus. The desired turbulent combustion zone adjacent the atomized oil spray may be obtained by the introduction around the oil spray of air jets alone without combustible gas. In this case, of course, a greater part of the oil will be completely burned with a consequent decrease in the yield of carbon black. The air and/or gas, or mixtures of air and gas, for forming the turbulent combustion zone may be supplied to the reaction chamber in other ways, for example, tangentially, without departing from the principle of providing an atomized spray of hydrocarbon oil of the specified characteristics surrounded by turbulent combustion zone.

Figure 8:
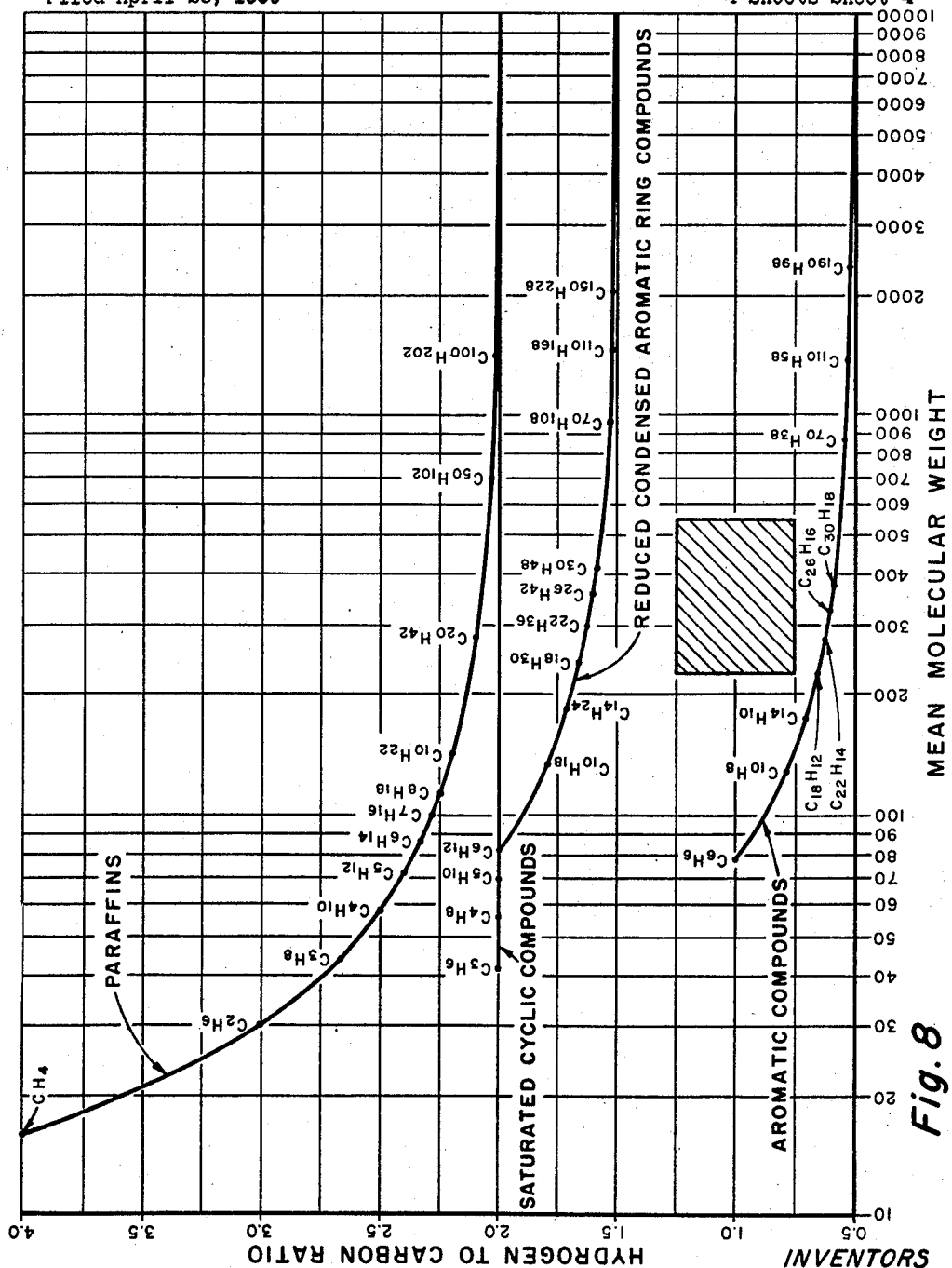
Fig. 8 is a diagrammatic representation of the range of hydrocarbon oils utilized in the process of the invention.

Fig. 8 of the drawing is a diagrammatic chart of hydrocarbons in which mean molecular weight is plotted against the hydrogen to carbon ratio. Curves of typical types of hydrocarbons are shown on the chart for the purpose of orientation. The ranges of mean molecular weight and hydrogen to carbon ratio of the oils which are used in the process of the invention are indicated by the shaded area of the chart. It is to be noted that the shaded area does not indicate the limits of the components of the oils used in the process of the invention but only the mean molecular weights and hydrocarbon ratios of the oils, which may be the means of component hydrocarbon species substantially outside the ranges indicated by the shaded area.

Some of the possible operating conditions selected from actual runs of the process of the invention are set forth in Table II. In Table III are the results of tests conducted on natural and synthetic rubber compounded with the products of the various runs illustrated.

rubber compounds were prepared from samples of black from each of the above runs and from representative samples of an easy processing channel (EPC) black and from Sterling 105, a fine furnace (FF) gas black. The figures listed below in Table III are representative of cures as follows:

Modulus—average of 60 and 90 min. cures
Tensile—average of two cures giving highest values
Torsional hysteresis—60 min. cure
Abrasion and rebound—70 min. cure Abrasion figures are shown in terms of volume index-cc. of rubber abraded per 1 million revolutions of an angle abrader.

*Table II*

| Run | Oil | Furnace Size | Atomizing Gas | | Arbitrary¹ velocity factor, ft./sec. Oil Tip | Gas Head | No. of Orifices Gas Head | Percent theoretical combustion of all combustibles | Color (Scale) | Tint | I₂ Surface Area, sq. M. per gm. | Yield, Lbs. per gal. oil |
|---|---|---|---|---|---|---|---|---|---|---|---|---|
| | | | Type | c. f./gal. oil | | | | | | | | |
| GP 943 | I | 21. 15′ x 27″ | Nat | 53 | 929 | 1,250 | 12 | 24.8 | 98 | 95 | 21 | 6.78 |
| GP 1779 | VI | 6. 15′ x 18″ | Nat | 15 | 610 | 1,062 (Air) | 12 | 34 | 98.5 | 119 | 47 | 3.83 |
| GP 1917 | VI | 11. 15′ x 27″ | Nat | 15 | 677 | 543 | 24 | 34 | 97.5 | 110 | 32 | 2.9 |
| GP 1921 | VI | 11. 15′ x 27″ | Nat | 15 | 677 | 543 | 12 | 34.3 | 96.3 | 115 | 30 | 3.00 |
| GP 1932 | VI | 11. 15′ x 27″ | Nat | 15 | 677 | 543 | 6 | 33.4 | 95.6 | 116 | 38 | 3.68 |
| GP 1948 | VI | 11. 15′ x 27″ | Nat | 15 | 677 | 543 | 3 | 34.5 | 94.9 | 119 | 36 | 3.48 |
| GP 1088 | I | 21. 15′ x 27″ | Nat | 78.6 | 952 | 300 | 12 | 42.7 | 88.9 | 178 | 195 | 2.47 |
| GP 1130 | I | 21. 15′ x 27″ | Nat | 79.5 | 853 | 299 | 12 | 45.0 | 89.2 | 194 | 239 | 2.20 |
| GP 1103 | I | 11. 15′ x 27″ | Nat | 78 | 830 | 298 | 12 | 43.6 | 91.3 | 174 | 89 | 2.77 |
| GP 1104 | I | 11. 15′ x 27″ | Nat | 81 | 860 | 298 | 12 | 51 | 88.7 | 184 | 173 | 1.9 |
| GP 1165 | I | 6. 15′ x 18″ | Nat | 76 | 815 | 353 | 12 | 45 | 88.9 | 198 | 98 | 2.7 |
| GP 1171 | I | 6. 15′ x 18″ | Nat | 76 | 1,160 | 355 | 12 | 40 | 89 | 194 | 71 | 2.74 |
| GP 1161 | I | 6. 15′ x 18″ | Nat | 76.7 | 808 | 710 | 12 | 45 | 90.2 | 188 | 73 | 3.23 |
| GP 1162 | I | 6. 15′ x 18″ | Nat | 77 | 812 | 1,070 | 12 | 45 | 90.4 | 173 | 63 | 3.48 |
| GP 1296 | I | 6. 15′ x 18″ | Nat | 41 | 780 | 353 | 12 | 41.5 | 90.1 | 182 | 71 | 2.72 |
| SRM 3540 | II | 10. 65′ x 18″ | Nat | 80 | 821 | 1,045 | 24 | 38 | 90.1 | 194 | 58 | 2.57 |
| SRM 3526 | VI | 10. 65′ x 18″ | Nat | 70 | 711 | 766 | 6 | 38 | 90.5 | 182 | 75 | 2.85 |
| SRM 3508 | VI | 10. 65′ x 18″ | Nat | 72 | 719 | 787 | 12 | 33 | 90 | 172 | 70 | 3.54 |

¹ Arbitrary velocity factor (VF) is calculated as follows: VF=vol. of gas (cu ft./hr.). Area of orifices (sq. ft.)×3600.
This velocity factor does not take into account temperatures leaving the burner of oil and gas, oil volume or orifice discharge coefficients.

In the above runs the flow of gas through the orifices of the gas head varies from 813 to 3518 cu. ft./hour measured at 60° F. and 30″ Hg.

In accordance with the standard natural and synthetic rubber recipes

| | Parts | |
|---|---|---|
| | Smoked Sheet | GR-S |
| Rubber | 100 | 100 |
| Carbon Black | 50 | 50 |
| Pine Tar | 3 | 3 |
| Zinc Oxide | 5 | 5 |
| Sulfur | 2.8 | 2 |
| Stearic Acid | 3 | |
| Anti-Oxidant (Agerite Hipar) | 1 | |
| Softener (Bardol) | | 5 |
| Acceleration: | | |
| Captax— | | |
| Furnace | 0.5 | |
| Channel | 0.9 | |
| Santocure— | | |
| Furnace | | 1 |
| Channel | | 1.25 |

*Table III*

| Run | Abrasion Volume Index | 300% Modulus | Tensile | Tors. Hyst. | Rebound Percent Rest. Energy | Type of Rubber |
|---|---|---|---|---|---|---|
| GP 943 | | 1,610 | 3,330 | .079 | 78.7 | Natl. |
| GP 1779 | 302 | 1,828 | 2,910 | .087 | 61.7 | Do. |
| GP 1917 | 331 | 1,605 | 2,640 | .095 | 61.6 | GR-S. |
| GP 1921 | 285 | 1,775 | 2,610 | .106 | 61.1 | Do. |
| GP 1932 | 295 | 1,885 | 2,585 | .090 | 61.6 | Do. |
| GP 1948 | 278 | 1,815 | 2,790 | .088 | 61.9 | Do. |
| GP 1088 | 208 | 2,180 | 4,270 | .19 | 69.6 | Natl. |
| GP 1130 | 218 | 2,340 | 4,400 | .17 | 68.9 | Do. |
| GP 1103 | 247 | 2,200 | 4,040 | .19 | 71.7 | Do. |
| GP 1104 | 221 | 2,100 | 4,140 | .23 | 67.5 | Do. |
| GP 1165 | 178 | 2,610 | 4,220 | .17 | 71. | Do. |
| GP 1171 | 203 | 2,700 | 4,270 | .15 | 71.7 | Do. |
| GP 1161 | 206 | 2,540 | 4,310 | .14 | 71.7 | Do. |
| GP 1162 | 212 | 2,400 | 4,270 | .14 | 72.4 | Do. |
| GP 1296 | 208 | 2,680 | 4,080 | .14 | 73.1 | Do. |
| SRM 3540 | 221 | 1,960 | 3,580 | .114 | 56.4 | GR-S. |
| SRM 3526 | 208 | 2,200 | 3,595 | .131 | 56.9 | Do. |
| SRM 3508 | 211 | 2,065 | 3,420 | .123 | 57.0 | Do. |
| Channel (EPC) | 296 | 1,365 | 3,900 | .27 | 67 | Natl. |
| Channel (EPC) | 260 | 1,300 | 2,660 | .27 | 55.9 | GR-S. |
| Sterling 105 (FF) | 290 | 1,060 | 3,350 | .27 | 66.6 | Natl. |
| Sterling 105 (FF) | 252 | 955 | 2,650 | .20 | 56.6 | GR-S. |

Although a principal object of our invention is to provide an improved apparatus and a process by which structure carbon blacks having exceptional rubber reinforcing and smoothout properties may be produced it is evident that a wide variety of blacks may be produced thereby. By varying the different operating conditions as discussed above it is possible to produce almost any type of known furnace black.

This application is a continuation-in-part of our applications Serial No. 88,388, filed April 19, 1949 and now abandoned, and Serial No. 142,068, filed February 2, 1950, and now abandoned.

We claim:

1. A process of producing carbon black which comprises introducing into a heat insulated reaction chamber an atomized spray of hydrocarbon oil having a hydrogen to carbon ratio of from about 0.75 to about 1.25 and a mean molecular weight of from about 225 to about 550, establishing about the periphery of said spray a turbulent zone of combustion by introducing a plurality of diverging jets of a combustible gas adjacent the periphery of the oil spray and surrounding the gas jets and oil spray with a relatively slow moving body of air in more than sufficient volume to support complete theoretical combustion of the gas jets but insufficient to support more than 50% theoretical combustion of all the combustible materials introduced into the chamber, and thereby dissociating the major portion of the hydrocarbon oil to carbon black.

2. A process as defined in claim 1 in which the hydrocarbon oil has an A.P.I. gravity of not more than 10, a viscosity in excess of 30 Saybolt seconds Universal at 210° F. and a Conradson carbon residue in excess of 1.5.

3. A process as defined in claim 1 in which the hydrocarbon oil spray is introduced into the chamber at a linear tip velocity factor of between 350 and 1100 feet per second.

4. A process as defined in claim 1 in which the hydrocarbon oil is gas atomized.

5. A process as defined in claim 4 in which the atomizing gas is air.

6. A process as defined in claim 1 in which the amount of air introduced into the chamber is sufficient to support between about 25% and about 50% theoretical combustion of all combustible materials introduced therein.

7. The process of producing carbon black which comprises introducing an atomized spray of hydrocarbon oil into an elongated heat insulated reaction chamber, establishing a turbulent zone of combustion about the periphery of said spray by introducing a plurality of jets of a combustible gas adjacent the periphery of the oil spray, and flowing a stream of air past said jets and spray, and thereby dissociating the major portion of the hydrocarbon oil to carbon black.

8. The process of producing carbon black which comprises introducing an atomized spray of hydrocarbon oil into an elongated heat insulated reaction chamber, establishing a turbulent zone of combustion about the periphery of said spray by introducing a plurality of jets of a combustible gas adjacent the periphery of the oil spray, and flowing a stream of air past said jets and spray in more than sufficient volume to support complete theoretical combustion of the gas jets but insufficient to support more than 50% theoretical combustion of all the combustible materials introduced into the chamber, and thereby dissociating the major portion of the hydrocarbon oil to carbon black.

9. The process of producing carbon black which comprises introducing an atomized spray of hydrocarbon oil into an elongated heat insulated reaction chamber, establishing a turbulent zone of combustion about the periphery of said spray by introducing a plurality of jets of a combustible gas adjacent the periphery of the oil spray, and flowing a diverging stream of air past said jets and spray, and thereby dissociating the major portion of the hydrocarbon oil to carbon black.

10. The process of producing carbon black which comprises introducing an atomized spray of hydrocarbon oil into an elongated heat insulated reaction chamber, establishing a turbulent zone of combustion about the periphery of said spray by introducing a plurality of jets of a combustible gas adjacent the periphery of the oil spray, and flowing a relative slowly moving stream of air past said jets and spray, and thereby dissociating the major portion of the hydrocarbon oil to carbon black.

11. The process of producing carbon black which comprises introducing an atomized spray of hydrocarbon oil into an elongated heat insulated reaction chamber, establishing a turbulent zone of combustion about the periphery of said spray by introducing a plurality of jets of a combustible gas adjacent the periphery of the oil spray, and flowing a substantially non-turbulent stream of air past said jets and spray, and thereby dissociating the major portion of the hydrocarbon oil to carbon black.

12. The process of producing carbon black which comprises atomizing hydrocarbon oil, introducing the atomized oil as a spray into an elongated heat insulated reaction chamber, establishing a turbulent zone of combustion about the periphery of said spray by introducing a combustible gas in from 3 to 24 jets in a circle around and adjacent the periphery of said spray and flowing a stream of air in volume sufficient to support between 25 and 50% theoretical combustion of all combustible material introduced into the chamber, and thereby dissociating the major portion of the hydrocarbon oil to carbon black.

13. The process of producing carbon black which comprises atomizing hydrocarbon oil with between 10 and 90 cubic feet of air per gallon of oil, introducing the atomized oil as a spray at a tip velocity factor of between 300 and 1000 feet per second into an elongated heat insulated reaction chamber, establishing a turbulent zone of combustion about the periphery of said spray by introducing a combustible gas in from 3 to 24 jets in a circle around and adjacent the periphery of said spray and flowing a stream of air in volume sufficient to support between 25 and 50% theoretical combustion of all combustible material introduced into the chamber, and thereby dissociating the major portion of the hydrocarbon oil to carbon black.

References Cited in the file of this patent

UNITED STATES PATENTS

| | | |
|---|---|---|
| 1,438,032 | Frost | Dec. 5, 1922 |
| 1,765,991 | Miller | June 24, 1930 |
| 1,887,407 | Forney | Nov. 8, 1932 |
| 1,992,752 | Kershaw | Feb. 26, 1935 |
| 2,124,175 | Zink | July 19, 1938 |
| 2,144,098 | Baker | Jan. 17, 1939 |
| 2,292,355 | Ayers | Aug. 11, 1942 |
| 2,375,797 | Krejci | May 15, 1945 |
| 2,499,438 | Wiegand et al. | Mar. 7, 1950 |
| 2,507,580 | Stokes | May 16, 1950 |
| 2,516,134 | Molique | July 25, 1950 |
| 2,558,838 | Goodson | July 3, 1951 |
| 2,564,700 | Krejci | Aug. 21, 1951 |
| 2,564,736 | Stokes | Aug. 21, 1951 |
| 2,572,734 | Kramer | Oct. 23, 1951 |